United States Patent [19]
Merritt, Jr.

[11] 3,832,419
[45] Aug. 27, 1974

[54] ORGANOPOLYSILOXANE-POLYCARBONATE BLOCK COPOLYMERS

[75] Inventor: Will D. Merritt, Jr., Lenox, Mass.

[73] Assignee: General Electric Company, Schenectady, N.Y.

[22] Filed: Mar. 23, 1973

[21] Appl. No.: 344,189

[52] U.S. Cl. .... 260/824 R, 260/46.5 R, 260/47 XA
[51] Int. Cl. ........................................... C08g 47/04
[58] Field of Search ....... 260/46.5 R, 824 R, 47 XA

[56] References Cited
UNITED STATES PATENTS
3,189,662   6/1965   Vaughn, Jr. .................... 260/824 R
3,679,774   7/1972   LeGrand ......................... 260/824 R Primary Examiner—Melvyn I. Marquis

[57] ABSTRACT

An improved process for the preparation of organopolysiloxane-polycarbonate block copolymers from halogen chain-stopped organopolysiloxane, dihydric phenol and phosgene is provided by using ammonia as the acceptor in the initial dihydric phenol halogen chain-stopped organopolysiloxane reaction, this reaction being followed by phosgenation to form the copolymer.

9 Claims, No Drawings

ORGANOPOLYSILOXANE-POLYCARBONATE BLOCK COPOLYMERS

This invention relates to the preparation of organopolysiloxane-polycarbonate block copolymers. More particularly, it relates to an improved process for the preparation of such copolymers in which the initial reaction of halogen chain-stopped organopolysiloxane with dihydric phenol uses ammonia as an acid acceptor. This reaction product is then phosgenated using additional dihydric phenol to form the final block copolymer.

The reaction of halogen chain-stopped organopolysiloxane with dihydric phenol and phosgene to form organopolysiloxane-polycarbonate block copolymers is well known and is described, for example, in U.S. Pat. No. 3,189,662 assigned to the same assignee as the present invention. According to the above patent, pyridine is used as an acid acceptor in the initial halogen chain-stopped organopolysiloxane-dihydric phenol reaction and in the phosgenation. While this process has been found to be efficacious, pyridine is quite expensive and is difficult to either recover or dispose of after it has played its role in the reaction. Additionally, traces of pyridine which remain in the final copolymer reaction product lead to thermal degradation of the final product. It is accordingly a primary object of the present invention to provide an improved process for the preparation of organopolysiloxane-polycarbonate block copolymers.

Briefly, according to the invention, organopolysiloxane-polycarbonate block copolymers are prepared by using ammonia as an acid acceptor in the initial halogenated organopolysiloxane-dihydric phenol reaction. It has been unexpectedly found that not only is ammonia much more readily removed than pyridine, for example, and other prior art materials, but its removal is so complete that it does not remain in the final produce as an impurity which can cause degradation. It will be realized, of course, that primary and secondary amines can be used in lieu of ammonia, all of such materials also being useful in admixture. Useful primary amines include methyl amine, ethyl amine and aniline. Secondary amines include dimethyl amine, diethyl amine an N-methyl aniline.

The compositions of the present invention, referred to hereinafter as the "copolymer" have the average formula

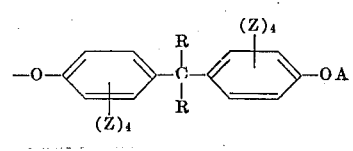

A is a member selected from the class of hydrogen and

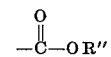

R is a member selected from the class of hydrogen, monovalent hydrocarbon radicals and halogenated monovalent hydrocarbon radicals, $R'$ is a member selected from the class of monovalent hydrocarbon radicals, halogenated monovalent hydrocarbon radicals and cyanoalkyl radicals, $R''$ is a member selected from the class consisting of monovalent hydrocarbon radicals and halogenated hydrocarbon radicals, and Z is a member selected from the class of hydrogen, lower alkyl radicals and halogen radicals and mixtures thereof.

Included within the radicals represented by R of Formula 1 are aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl including methyl, ethyl, propyl, chlorobutyl, cyclohexyl, etc.; R can be all the same radical or any two or more of the aforementioned radicals, while R is preferably methyl, $R'$ includes all radicals included by R above except hydrogen, where $R'$ also can be all the same radical or any two or more of the aforementioned R radicals except hydrogen, and $R'$ is preferably methyl. $R'$ also includes, in addition to all the radicals included by R, except hydrogen, cyanoalkyl radicals such as cyanoethyl, cyanobutyl, etc. radicals. Radicals that are included within the definition of Z of Formula 1 are hydrogen, methyl, ethyl, propyl, chloro, bromo, iodo, etc. and combinations thereof, and Z is preferably hydrogen.

The hydrolytically stable copolymers of the present invention can be further described as comprising recurring copolymeric units of a polydiorganosiloxane joined by substituted aryloxy-silicon linkages to a polyester of dihydric phenol and carbonic acid, where each of said recurring copolymeric units comprises by average weight from about 10 percent to about 75 percent of said polydiorganosiloxane, and preferably from about 40 to 70 percent by weight.

The copolymers of Formula 1 can be produced by reacting at temperatures in the range of 0° to 100°C, preferably 20° to 50°C, and in the presence of an acid acceptor, a mixture of a halogen chain-stopped polydiorganosiloxane having the formula (1)

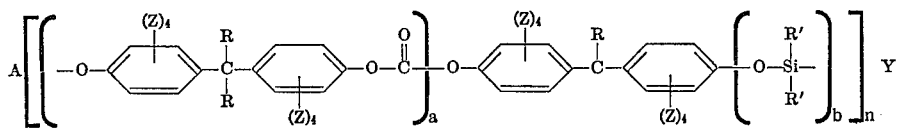

where n is at least 1, and perferably n is an interger equal to from 1 to about 1,000, inclusive, a is equal to from 1 to about 200, inclusive, b is equal to from about 5 to about 200, inclusive, and preferably b has an average value from about 15 to about 90, inclusive, while the ratio of a to b can vary from about 0.05 to about 3, inclusive, and when b has an average of from about 15 to about 90, inclusive, the ratio of a to b is preferably from about 0.067 to about 0.45, inclusive, Y is (2) 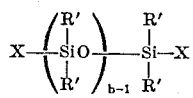

and a dihydric phenol having the formula (3) 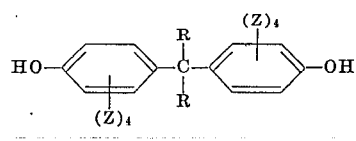

and thereafter phosgenating said reaction product until the resulting copolymer achieves a maximum intrinsic viscosity, wherein R, R', Z and b are as defined above, and X is a halogen radical, preferably chloro.

The halogen chain-stopped polydiorganosiloxanes of Formula 2 can be made by conventional procedures such as by the controlled hydrolysis of a diorganodihalosilane, for example, dimethyldichlorosilane as taught in Patnode U.S. Pat. No. 2,381,366 and Hyde U.S. Pat. Nos. 2,629,726 and 2,902,507.

Another procedure that can be employed involves equilibrating a mixture of a diorganodichlorosilane and a cyclic polydiorganosiloxane in the presence of a metal catalyst such as ferric chloride as shown in Sauer U.S. Pat. No. 2,421,653. Although the various procedures utilized in forming the halogen chain-stopped polysiloxane are not critical, generally it has been found desirable to maintain the halogen content of the resulting halogen chain-stopped polysiloxane in the range of about 0.4 percent to about 35 percent, by weight, and preferably from about 1 percent to about 10 percent by weight of said halogen chain-stopped polysiloxane. The halogen chain-stopped polysiloxane is preferably in the form of a chlorinated polydimethylsiloxane.

Dihydric phenols that are included in Formula 3 are, for example 2,2-bis(4-hydroxyphenyl)-propane (bisphenol-A); 2,4'-dihydroxydiphenylmethane; bis-(2-hydroxyphenyl)-methane; bis-(4-hydroxyphenyl)-methane; 1,1-bis-(4-hydroxyphenyl)-ethane; 1,2-bis-(4-hydroxyphenyl)-ethane; 1,1-bis-(4-hydroxy-2-chlorophenyl)-ethane; 1,1-bis-(2,5-dimethyl-4-hydroxyphenyl)-ethane; 1,3-bis-(3-methyl1-4-hydroxyphenyl)-propane; 2,2-bis-(3-isopropyl-4-hydroxyphenyl)-propane; etc. Mixtures can also be used. Others will occur to those skilled in the art.

The copolymers of the present invention comprise recurring units consisting of a polydiorganosiloxane interconnected by substituted aryloxy-silicon linkages to a polyester of carbonic acid and a dihydric phenol. In addition to being hydrolytically stable, the preferred copolymers of the present invention, i.e., those copolymers in Formula 1 where the ratio of a to b has an average value of from about 0.067 to about 0.45, are valuable elastomeric materials having high tensile strength, good electrical properties and many other desirable characteristics. Not only do these preferred copolymers possess substantially all of the desirable characteristics of conventionally cured reinforced organopolysiloxanes but the preferred copolymers of the present invention do not have to be reinforced with filler material, such as finely divided silica, which often detracts from the properties of the cured polymer. Certain of the copolymers of the present invention can be fabricated into films and parts by usual molding and extrusion methods.

In the practice of the invention, an anhydrous mixture of the halogen chain-stopped polysiloxanes of Formula 2 and the polyhydric phenol of Formula 3 is formed in the presence of ammonia, and at temperatures sufficient to effect reaction. In the course of the reaction, an intermediate reaction product is produced in the form of a polydiorganosiloxane that is chain-stopped by a hydroxy-aryloxy radical. This reaction intermediate is purified in the usual manner and then phosgenated along with additional dihydric phenol, i.e., treated with a precursor of carbonic acid such as carbonyl chloride or carbonyl fluoride until the resulting copolymer attains a maximum intrinsic viscosity.

In the production of the intermediate reaction product, has been found desirable to employ a suitable inert organic solvent in the reaction mixture to facilitate product formation. Suitable organic solvents include ethylene chloride, methylene chloride, chloroform, chlorobenzene, etc., while generally any organic solvent that is inert to the reactants and sufficiently high in boiling point to achieve satisfactory results can be employed.

Although the order of addition of the reactants is not critical, it has been found expedient to add the halogen chain-stopped polysiloxane to an organic solvent solution of the polyhydric phenol and the ammonia or other suitable acid acceptor. The proportions of ammonia that are utilized should be at least sufficient to remove all of the by-product acid formed which will vary in accordance with the proportions of the reactants employed.

Temperatures in the range of 0° to 100°C can be employed during the formation of the intermediate reaction product while a preferred range is 20° to 50°C.

Phosgenation of the intermediate reaction product, to produce the copolymers of the present invention, can be accomplished by merely passing a carbonic acid precursor such as a halogenated carbonyl, for example, carbonyl chloride or carbonyl fluoride into the purified resulting intermediate reaction product mixture along with additional dihydric phenol. During the phosgenation, it has been found expedient to agitate the mixture such as by stirring. As a practical matter, phosgenation can be continued until maximum viscosity of the resulting mixture is achieved, although excess amounts of phosgene can be tolerated without adverse effects. The final product can be recovered and purified by conventional procedures such as washing, filtering, precipitation, etc.

In order that those skilled in the art may be better able to practice the invention, the following examples are given by way of illustration and not by way of limitation. All parts are by weight where not otherwise indicated.

Halogen chain-stopped polysiloxanes in the form of a halogen chain-stopped polydimethylsiloxane were prepared in accordance with the following procedures.

Example A

Into a vessel containing 800 parts of dimethyldichlorosilane, there was added over a 2 hour period a mixture of 100 parts of water and 206 parts of dioxane. The resulting mixture was heated to a gentle reflux with stirring until it had become homogeneous. The mixture was stripped, in vacuo, to a pot temperature of 202°C at 12 mm. pressure. The stripped hydrolyzate was then filtered to yield 323 parts of a clear oil containing 4.9 percent hydrolyzable chlorine. The calculated average formula of the halogen chain-stopped polydimethyl-

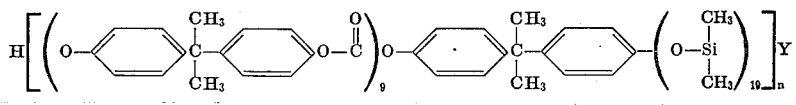 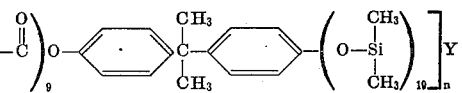

siloxane was as follows based on method of preparation and hydrolyzable chlorine content:

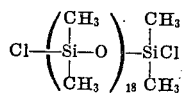

Example B

To a vessel containing 283 parts ethyl ether and 400 parts dimethyldichlorosilane were added, over a 2 hour period, 50.2 parts distilled water. The mixture was then gently refluxed for two more hours. The mixture was stripped at atmospheric pressure to remove the ether and then at 260°C. at 26 mm Hg pressure. The resulting product contained 9.2 percent hydrolyzable chlorine. The calculated average formula of the halogenated polydimethylsiloxane was as follows based on the method of preparation and hydrolyzable chlorine content:

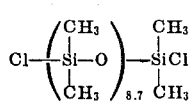

This example illustrates the use of ammonia as an acid acceptor in the organopolysiloxane-dihydric phenol reaction.

Example 1

To a vessel equipped with gas inlet tube, condenser and stirrer and outlet stopcock, there were charged 456 parts bisphenol-A and 8,000 parts of methylene chloride. With constant stirring, about 40 parts of gaseous ammonia were added through the gas inlet tube extending below the liquid surface until the bisphenol-A dissolved. This procedure took about 15 minutes. There were then added to the mixture over a period of about 45 minutes, 1,535 parts of the abovedescribed chlorine chain-stopped dimethylpolysiloxane of Example A, the stirring being continued for about 15 more minutes after which about 2,000 parts of water were added. The mixture was then acidified to a pH of about 6 with concentrated HCl, the mixture after standing separating into two layers. The organic layer containing the product was recovered from the bottom outlet on the vessel and washed with water to the absence of ammonium ion. 40 parts of end-capped organopolysiloxane so prepared as a 10 percent by weight solution in methylene chloride, 38.4 parts bisphenol-A, 83 parts lime, 300 parts methylene chloride and five hundreths part pyridine as a catalyst were placed in a vessel. Forty parts of phosgene were added, the last half of the phosgene being added at a relatively slow rate of five tenths part per minute as compared to about one part per minute initially, at which point maximum viscosity was achieved. About 300 parts of methylene chloride were added and the mass was filtered. The filtrate was washed with dilute HCl and then with water and the solvent evaporated to give the polymer. A thin film of the polymer cast from a chloroform solution was found to be strong, clear and elastic.

Based on method of preparation and infrared data, the average formula of the copolymer was were $n$ has an average value of about 250, and Y is

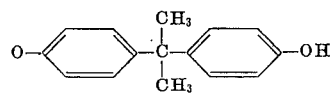

Example 2

The above example was repeated using ethylene dichloride as a solvent.

While in the above examples the ammonia is first added to the dihydric phenol to produce a solution to which halogen chain-stopped organopolysiloxane is added, the ammonia can as well be added to a mixture of the dihydric phenol and halogen chain-stopped organopolysiloxane.

The copolymers of the present invention are useful as electrical and other insulation, as binding materials for structures and laminates, in adhesive formulations, coating compositions and the like. It will be realized, of course, that the initial end-capped materials of the present invention are useful for preparing other new and useful organopoly-siloxanes.

What I claim as new and desire to secure by Letters Patent of the United States is:

1. A process for making block copolymers which comprises (1) reacting (A) a halogen chain-stopped polydiorganosiloxane composed of from about five to 200 chemically combined diorganosiloxy units consisting essentially of dialkylsiloxy units which are connected to each other by silicon-oxygen-silicon linkages wherein each of the silicon atoms has two organo radicals attached through a carbon-silicon bond, and (B) a dihydric phenol having the formula

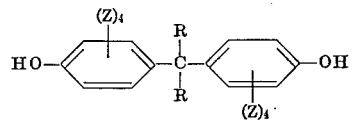

where Z is a member selected from the class consisting of hydrogen, lower alkyl radicals and halogen radicals and combinations thereof, and R is a member selected from the class consisting of hydrogen, hydrocarbon and halogenated hydrocarbon radicals, and (2) phosgenating the purified reaction product of (1) in the presence of additional dihydric phenol until the resulting copolymer achieves a maximum intrinsic viscosity, said process being characterized by using a material selected from ammonia, primary amine, secondary amine and mixtures thereof as an acid acceptor in the reaction of (A) and (B).

2. The process of claim 1 wherein said dihydric phenon is a bisphenol.

3. Process of claim 2 wherein said dihydric phenol is 2,2-bis(4-hydroxyphenyl) propane.

4. Process of claim 1 wherein said polydiorganosiloxane is a polydimethylsiloxane.

5. The process of claim 1 wherein said acid acceptor is ammonia.

6. The process of claim 1 wherein said acid acceptor is a primary amine.

7. The process of claim 1 wherein said acid acceptor is secondary amine.

8. The process of claim 1 wherein the reaction of A and B is at from 0° to 100°C.

9. The process of claim 1 wherein the reaction of A and B is at from 20° to 50°C.

* * * * *

UNITED STATES PATENT OFFICE
CERTIFICATE OF CORRECTION

Patent No. 3,832,419　　　　　Dated　August 27, 1974

Inventor(s)　Will D. Merritt, Jr.

It is certified that error appears in the above-identified patent and that said Letters Patent are hereby corrected as shown below:

Column 1, line 38, "produce" should read -- product --; line 44, "an" should read -- and --; in the formula
$"\underset{C}{R}"$ should read -- $\underset{R}{\overset{R}{\underset{|}{\underset{C}{|}}}}$ --; line 58, "interger" should read
-- integer --; line 64, after "average" and before "of" insert
-- value --. Column 3, line 46, "methyll" to -- methyl --.
Column 5, line 57, "hundreths" should read -- hundredths --.

Signed and sealed this 21st day of January 1975.

(SEAL)
Attest:

McCOY M. GIBSON JR.　　　　　　　C. MARSHALL DANN
Attesting Officer　　　　　　　　Commissioner of Patents